(12) United States Patent
Li

(10) Patent No.: US 7,338,049 B2
(45) Date of Patent: Mar. 4, 2008

(54) SELF-COOLING FERRFLUID SEAL

(75) Inventor: Zhixin Li, Hudson, NH (US)

(73) Assignee: Ferrotec (USA) Corporation, Bedford, NH (US)

( * ) Notice: Subject to any disclaimer, the term of this patent is extended or adjusted under 35 U.S.C. 154(b) by 104 days.

(21) Appl. No.: 11/161,910

(22) Filed: Aug. 22, 2005

(65) Prior Publication Data

US 2006/0043682 A1    Mar. 2, 2006

Related U.S. Application Data

(60) Provisional application No. 60/604,673, filed on Aug. 26, 2004.

(51) Int. Cl.
*F16J 15/43* (2006.01)
(52) U.S. Cl. ...................... 277/410; 277/930
(58) Field of Classification Search .............. 277/410, 277/930
See application file for complete search history.

(56) References Cited

U.S. PATENT DOCUMENTS

| | | | | |
|---|---|---|---|---|
| 2,223,519 A | * | 12/1940 | Hornschuch | 277/515 |
| 3,889,960 A | * | 6/1975 | Wiese | 277/397 |
| 4,109,920 A | * | 8/1978 | Wiese | 277/408 |
| 4,114,899 A | * | 9/1978 | Kulzer et al. | 277/367 |
| 4,335,885 A | * | 6/1982 | Heshmat | 277/347 |
| 4,527,802 A | * | 7/1985 | Wilcock et al. | 277/302 |
| 4,605,233 A | * | 8/1986 | Sato | 277/410 |
| 4,644,202 A | * | 2/1987 | Kroy et al. | 310/58 |
| 4,674,109 A | | 6/1987 | Ono | |
| 4,696,481 A | * | 9/1987 | Iversen | 277/410 |
| 4,734,606 A | * | 3/1988 | Hajec | 310/90.5 |
| 4,822,972 A | * | 4/1989 | Sugioka et al. | 219/619 |
| 4,872,689 A | * | 10/1989 | Drumm | 277/408 |
| 5,331,884 A | * | 7/1994 | Ando | 92/108 |
| 5,421,892 A | | 6/1995 | Miyagi | |
| 5,486,728 A | | 1/1996 | Hirama | |
| 5,954,342 A | * | 9/1999 | Mikhalev et al. | 277/410 |
| 6,300,693 B1 | * | 10/2001 | Poag et al. | 310/54 |
| 2004/0036367 A1 | * | 2/2004 | Denton et al. | 310/61 |

* cited by examiner

*Primary Examiner*—Alison K Pickard
(74) *Attorney, Agent, or Firm*—Robert R Deleault, Esq.; Mesmer & Deleault, PLLC

(57) ABSTRACT

A self-cooling ferrofluid seal includes a housing having a housing case and an external pole piece integrally connected to the housing case where the housing case has a plurality of heat dissipating surfaces, a magnetic circuit within the housing formed in conjunction with the external pole piece, a rotatable shaft having one or more fan blades where the rotatable shaft is coaxially aligned within the housing, and a quantity of magnetic fluid between the rotatable shaft and the external pole piece forming a ferrofluid seal.

17 Claims, 3 Drawing Sheets

SELF-COOLING FERRFLUID SEAL

This application claims the benefit of U.S. Provisional Patent Application No. 60/604,673, filed Aug. 26, 2004.

BACKGROUND OF THE INVENTION

1. Field of the Invention

The present invention relates generally to the cooling of ferrofluid seals. Particularly, the present invention relates to self-cooling ferrofluid seals.

2. Description of the Prior Art

Ferrofluid seals are widely used in industry. Typically, a ferrofluid seal contains a magnetic circuit that is composed of stationary elements such as magnets and pole pieces, and a rotating element such as a shaft. Magnetic fluid is confined between the rotating and stationary elements by the magnetic field of the magnet and formed into a series of liquid O-rings, which provide sealing.

Heat generation has been a common problem for ferrofluid seals that operate at high speed. The viscous heat generated by the magnetic fluid tends to heat up the seal to a level that does not allow for the proper operation of the seal. Typically, water cooling or another coolant is used to overcome this problem. When water is not available, externally introduced forced air convection methods (such as an external fan), or natural convection cooling methods are used.

U.S. Pat. Nos. 4,674,109 and 5,421,892 are examples of liquid cooled ferrofluid seals. U.S. Pat. No. 4,674,109 (1987, Ono) discloses an x-ray tube device with an anode target capable of rotation and a cathode which generates electrons causing them to collide with the target set in a vacuum envelope, and with a shaft which supports and rotates the anode projecting outside the envelope. This x-ray tube device has a structure such that the target is cooled by coolant flowing through coolant channels in the shaft. A vacuum seal is maintained by seal means such as magnetic fluid seal between the envelope and the rotating shaft. The envelope and coolant channels are best maintained at ground potential, and thus have an intermediate potential, with high positive and negative voltages supplied to the anode target and cathode.

U.S. Pat. No. 5,421,892 (1995, Miyagi) discloses a vertical heat treating apparatus that includes a cap body, which is movable up and down, for sealing a treatment vessel that holds objects to be treated. A rotary loading device is provided with a rotary shaft which extends into a through hole provided in the cap body, and a magnetic fluid seal member is provided around the rotary shaft. Heat-exchange media, such as water or ethylene glycol, is circulated within the rotary shaft, preferably to cool the rotary shaft. A temperature sensor may be provided in a housing for the rotary shaft, such that when the temperature exceeds a set temperature, the flow rate of the heat exchange medium is increased. Baffle plates may be provided about an upper surface of the cap body and opposed to the through hole in the cap body. In one embodiment of the invention, nitrogen gas is circulated through the through-hole in the cap body to prevent corrosive gas from contacting the shaft. Circumferential grooves are defined around the rotary shaft at locations where the heat exchange medium is admitted and discharged from the rotary shaft. Preferably, the heat exchange medium is circulated in the rotary shaft above and below the level of the magnetic seal.

The following example uses the Peltier effect to cool a ferrofluid seal. U.S. Pat. No. 5,486,728 (1996, Hirama) discloses a micromotor. The micromotor includes a cylindrical rotor casing having a central through-hole, and a rotor having a cylindrical, magnetic rotor block fixed on a rotor shaft and inserted in the central through-hole of the rotor casing. First and second bearings support the rotor shaft for rotation and are fitted, respectively, in opposite ends of the central through-hole of the rotor casing and define a sealed rotor chamber therebetween. Stator coils are attached to the outer rotor circumference of the rotor casing, and a stator casing is joined to the rotor casing coaxially with the rotor so as to cover the stator coils. A magnetic fluid is filled in the sealed rotor chamber between the first and second bearings between which is disposed the magnetic rotor block. A series of Peltier elements are attached to the outer circumference of the stator casing and electrically connected to a power supply to adsorb heat generated by the operation of the components of the micromotor.

Each of the listed methods has limitations. The natural convection cooling method is frequently unable to provide enough cooling effect, and the seal has a tendency to overheat at high speeds. The externally introduced forced air convection method requires additional space and parts to integrate the fan, which introduces design problems and higher costs. Further, the internal components are difficult to be cooled by this method. When water or other liquid coolant is used, there is always the concern that the liquid coolant may leak out of the cooling channels and cause equipment damage and process contamination. The use of Peltier devices adds additional cost, space and parts to integrate these Peltier devices and further requires power to be supplied to the Peltier devices to effect cooling.

Therefore, what is needed is a cooling system for ferrofluid seals that eliminates coolant leaks. What is also needed is a cooling system that generates effective heat flow path and heat dissipation surface for both the stationary and rotating elements of the ferrofluid seal. What is further needed is a cooling system that generates effective airflow paths within the ferrofluid seal so that both its stationary and rotating elements can be cooled by forced convection. What is still further needed is a cooling system that generates airflow inside the seal to provide effective cooling to both the stationary and rotating elements of the seal. What is yet further needed is a cooling system that provides cooling simultaneously when the seal is operated and where the cooling effect increases proportionally with the operating speed of the seal.

SUMMARY OF THE INVENTION

It is an object of the present invention to provide a cooling system that eliminates the potential for coolant leaks. It is another object of the present invention to provide a cooling system that has effective heat flow paths and heat dissipation surfaces for both the stationary and rotating elements of the ferrofluid seal. It is yet another object of the present invention to generate effective airflow paths within the ferrofluid seal so that both its stationary and rotating elements can be cooled by forced convection. It is a further object of the present invention to provide airflow inside the seal to provide effective cooling to both the stationary and rotating elements of the seal. It is yet a further object of the present invention to provide a cooling system that provides cooling simultaneously when the seal is operated and where the cooling effect increases proportionally with the operating speed of the seal.

The present invention achieves these and other objectives by providing a self-cooling ferrofluid seal having at least a seal housing and a rotatable shaft. The seal housing includes a housing case and an external pole piece securely attached to the housing case. The housing case has a plurality of fins on the outside and may optionally include a plurality of vent channels and/or openings. The housing case is preferably made with heat dissipating materials.

The housing case contains various ferrofluid seal members including one or more bearings, a second pole piece, a magnet, and a predetermined amount of magnetic fluid/ferrofluid. The combination of the external pole piece, the magnet and the second pole piece in combination with the rotatable shaft forms the magnetic fluid seal circuit. The magnetic fluid seal is located between the external pole piece and the rotatable shaft. The external pole piece may optionally have one or more grooves or ridges creating one or more stages. The magnetic flux of the magnet causes the magnetic fluid to be contained between the one or more stages and the rotatable shaft creating one or more liquid O-ring seals. Alternatively, the rotatable shaft may have one or more grooves or ridges creating the one or more stages, or both the rotatable shaft and the external pole piece may have the grooves or ridges.

The pole pieces are made of a magnetic material and have an internal diameter sized to create an annular space between the pole pieces and the rotatable shaft. The portion of the rotatable shaft in the area of the one or more stages must also be made of a magnetic material. The rotatable shaft may be a solid rod or a hollow shaft. To facilitate heat transfer, a portion of the rotatable shaft may be made of a heat conducting material such as, for example, copper, while a magnetic portion on which the sealing stages are made is connected to the copper portion. Vent openings and channels may optionally be made into the shaft to provide effective air flow paths. The shaft may optionally include an inner shaft made of a heat dissipating material to help remove heat from the outer surface of the shaft. Heat dissipating surfaces such as, for example, fins may also be incorporated within a hollow shaft.

A key feature of the present invention is the incorporation of one or more fan blades onto the outer surface of the shaft that are configured to move an air flow through the inside of the self-cooling ferrofluid seal and out through the vent openings, channels and heat dissipation surfaces of the housing or shaft or both. The one or more fan blades may be attached to the rotatable shaft individually or as a sleeve, or they may be an integral part of the shaft. The one or more fan blades may be outside and/or inside of the ferrofluid seal.

As the shaft rotates, the one or more fan blades will generate the air flow to self-cool the ferrofluid seal. The air flow created by the one or more fan blades will force an air flow to pass through the air flow paths inside the shaft, the housing and the other ferrofluid seal components as well as across the heat dissipation surfaces of all of the components of the seal. The one or more fan blades may optionally be made of a heat conducting material to also act as a heat dissipating surface. The one or more fan blades may be placed in various locations inside the ferrofluid seal such as, for example, next to the pole piece, under the magnet, next to the bearings, etc., to provide cooling to these various components.

The cooling effect of the present invention occurs simultaneously with the operation of the ferrofluid seal. As the rotation speed increases, so does the cooling effect. This effectively balances the viscous heat generation of the magnetic fluid.

It should be noted that the housing of the ferrofluid seal may be made to rotate while the shaft is stationary. In this situation, the fan blades would preferably be attached to or incorporated into the housing instead of the shaft.

DETAILED DESCRIPTION OF THE PREFERRED EMBODIMENT

Figure 1:
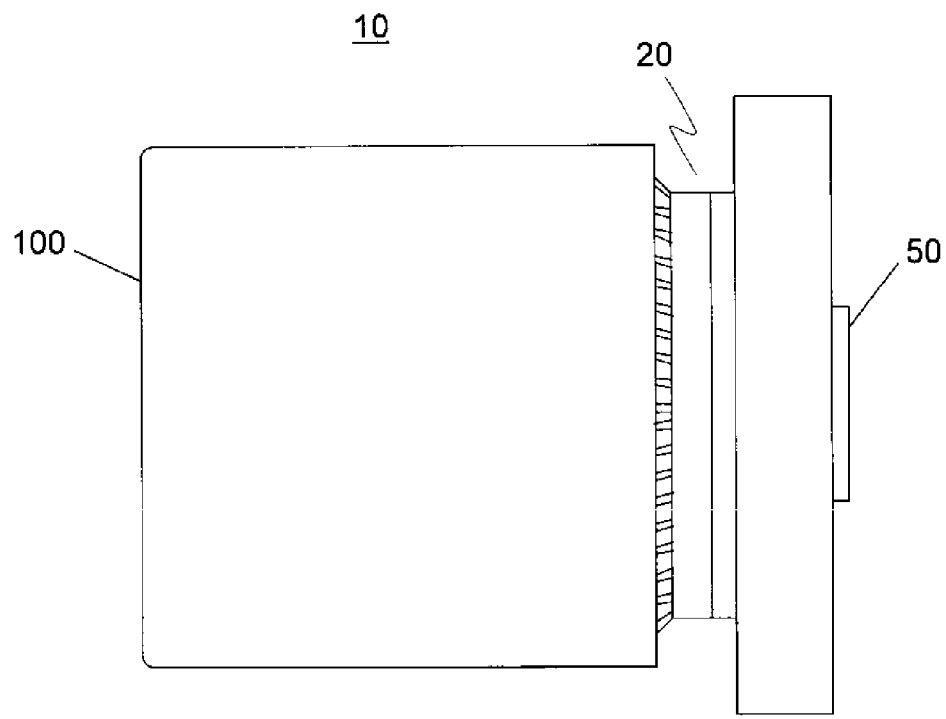
FIG. 1 is a side plan view of the preferred embodiment of the present invention.
Figure 2:
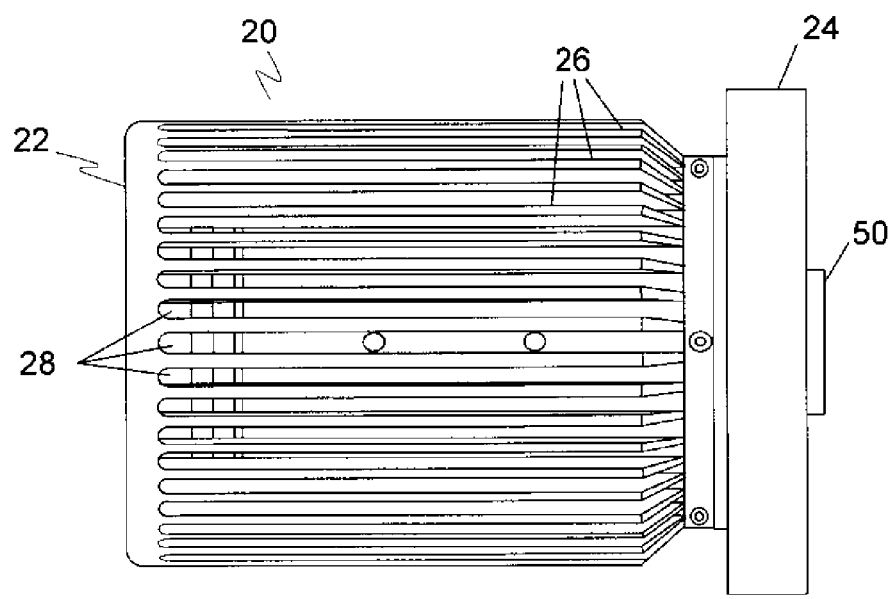
FIG. 2 is a side plan view of the embodiment in FIG. 1 showing the cooling fins of the housing.

The preferred embodiment of the present invention is illustrated in FIGS. 1-4. FIG. 1 illustrates an air-cooled, ferrofluid seal device 10. Ferrofluid seal device 10 includes a seal housing 20, a rotatable shaft 50 and an optional cover 100. Turning now to FIG. 2, there is illustrated seal housing 20 and rotatable shaft 50. Seal housing 20 includes a housing case 22 and a pole piece 24 securely attached to housing case 22. Housing case 22 is made of a heat conducting material, preferably copper, forming a good heat flow path for pole piece 24. Housing case 22 has a plurality of fins 26 and case vent channels 28. The plurality of fins 26 provides an effective heat dissipation surface.

Figure 3:
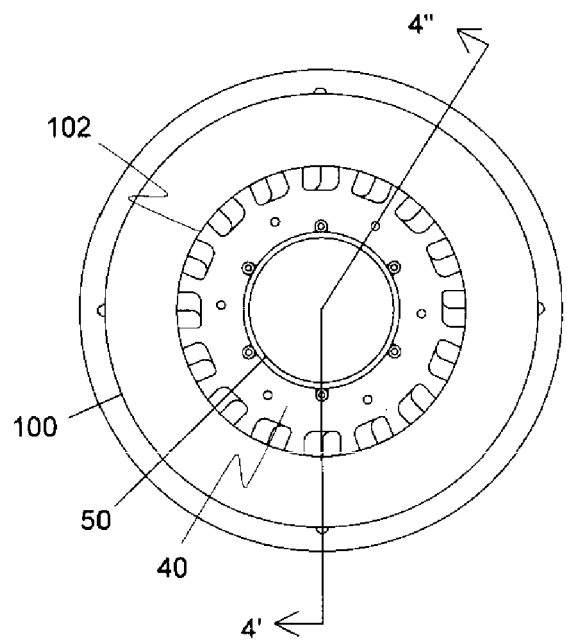
FIG. 3 is an end view of the embodiment in FIG. 1 showing the rotating shaft with end fan.

FIG. 3 illustrates an end view of ferrofluid seal device 10 showing the rotatable shaft 50, cover 100 and cover end opening 102. Shaft end fan blade 40 is seen through cover end opening 102 securely attached to rotatable shaft 50. Line 40'-40" indicates the cross-sectional view of ferrofluid seal device 10 illustrated in FIG. 4.

Figure 4:
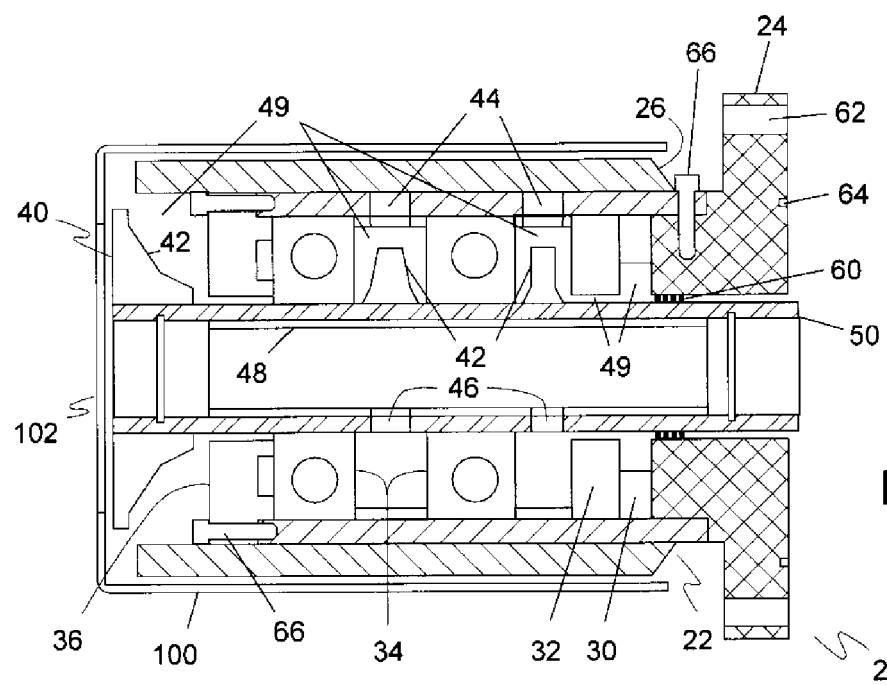
FIG. 4 is a cross-sectional view of the embodiment in FIG. 1 showing the rotating shaft with fan blades and the ferrofluid seal.

Turning now to FIG. 4, there is illustrated a cross-sectional view of seal housing 20, rotatable shaft 50, and cover 100. It should be understood that the illustrated components are not to scale but are exaggerated to facilitate an understanding of the present invention. Those of ordinary skill in the art are familiar with the manufacture of ferrofluid seals, the various magnetic circuit components and the size of the annular gap used to create the ferrofluid seal.

As previously mentioned, seal housing 20 includes housing case 22 and pole piece 24. Pole piece 24 is secured to housing case 22 preferably by securing hardware 66. Pole piece 24 also contains a plurality of openings 62 in its peripheral flange for receiving securing hardware such as a bolt to secure ferrofluid seal device 10 to an apparatus that requires such a sealing device. Pole piece 24 may also incorporate a recessed portion 64 for receiving an O-ring or some other sealing material.

The combination of pole piece 24 with a magnet 30 and second pole piece 32 constitutes a magnetic circuit 70. It should be understood by those of ordinary skill in the art that pole piece 24, magnet 30 and second pole piece 32 have inside diameters configured to create an annular space between their respective inside surfaces and the outside surface of rotatable shaft 50. The magnetic flux gradient produced by magnetic circuit 70 causes the formation of a ferrofluid seal with shaft 50 when a magnetic fluid 60 is added to the annular space forming one or more seal stages between pole piece 24 and shaft 50. Seal housing 20 also includes bearings 34 and a bearing retaining cap 36. Bearing retaining cap 36 holds the bearings 34, pole piece 32 and magnet 30 in a secure relationship within seal housing 20.

Housing case 22 further includes one or more case vent openings 44 that can be incorporated into housing case 22 to provide effective air flow paths for cooling the ferrofluid seal device 10. Case vent openings 44 are either in continuous or intermittent communication with air spaces 49 within ferrofluid seal 10.

Figure 5:
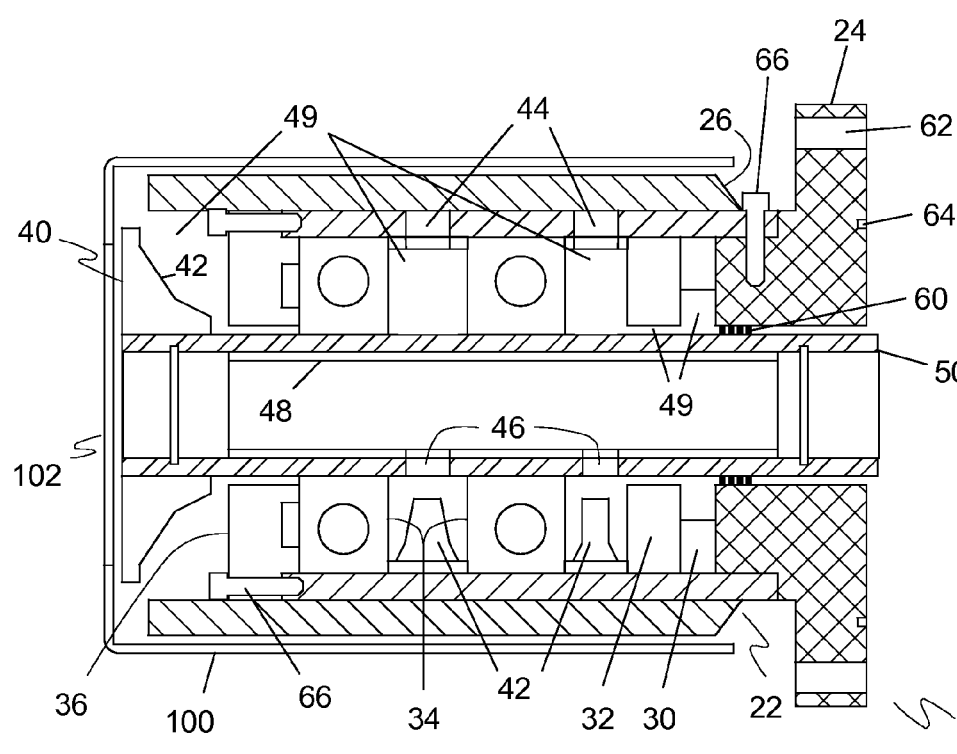
FIG. 5 is a cross-sectional view of the shaft of the present invention showing heat dissipating fins.

Rotatable shaft 50 may be solid or hollow and may be made of a good heat conducting material such as, for example, copper with a magnetic portion of shaft 50 on which the ferrofluid sealing stages are made being intimately attached to shaft 50. Alternatively, rotatable shaft 50 may be made of a magnetic material with a good heat conducting portion. In yet another alternative embodiment and illustrated in FIG. 4, shaft 50 may optionally incorporate an inner shaft 48 that is made of a good heat conducting material to enhance heat dissipation. One or more shaft vent openings 46 may also optionally be incorporated in shaft 50 where a hollow rotatable shaft is used and may also be incorporated in inner shaft 48 when such a configuration is used. In addition, or instead of the optional vent openings 46, inner shaft 48 may optionally include a plurality of heat dissipating fins 47 as illustrated in FIG. 5.

The unique feature of the present invention is the incorporation of at lease one fan blade to create an air flow through the ferrofluid seal device 10 when the ferrofluid seal device 10 is operated. In the preferred embodiment, shaft 50 has a fan 40 with a plurality of blades attached to one end of shaft 50 adjacent cover end opening 102. Fan 40 rotates when the shaft 50 is in operation causing an air flow to be drawn into the atmospheric side of the ferrofluid seal device 10 and out through case vent openings 44 and across fins 26. It should be understood that each of the plurality of fan blades may be individually attached or attached in groups to shaft 50 or they may be made as an integral part of shaft 50. Shaft 50 may optionally include one or more fan blades 42 in various locations along shaft 50 that coincide with seal device spaces 49 to further aid in the movement of air through seal device 10. Fan blades 42 may be integrally formed into the surface of shaft 50 or may be securely attached to shaft 50. It should be noted that in ferrofluid seals where the housing rotates around a stationary shaft, fan blades 42 could be incorporated at the inside surface of seal housing 20 or at the inside surface of any of the seal components in order to generate the air flow through the ferrofluid seal.

During operation of ferrofluid seal device 10, shaft 50 rotates and fan blades 42 generate a powerful air flow. The air flow generated by fan blades 42 passes through the air flow paths, i.e. spaces 49, and openings 44 and 46 in the housing case 22 and the shaft 50, respectively, and other parts of the ferrofluid seal device 10, and across/against the heat dissipation surfaces of all parts of the seal device 10, thus cooling the seal. Therefore, the cooling effect of the present invention occurs simultaneously with the operation of the ferrofluid seal device 10. As the rotating speed increases, the cooling effect will also increase, effectively balancing the viscous heat generation of the magnetic fluid 62.

Although the preferred embodiment discloses a rotating shaft 50 and a stationary housing 20, those of ordinary skill in the art will recognize that the housing 20 can be made to rotate while the shaft 50 is kept stationary. In this alternative configuration, the fan blades 42 would preferably be attached or integrated into the housing 20 instead of on the shaft 50 in order to create movement of air through the seal device 10.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A self-cooling ferrofluid seal comprising:
    a housing having a housing case and an external pole piece integrally connected to said housing case wherein said housing case has a plurality of heat dissipating fins and one or more vent openings;
    a magnetic circuit within said housing formed in conjunction with said external pole piece;
    a rotatable shaft having one or more fan blades wherein said rotatable shaft is coaxially aligned within said housing; and
    a quantity of magnetic fluid between said rotatable shaft and said external pole piece forming a ferrofluid seal.

2. The seal of claim 1 wherein said magnetic circuit has a plurality of air passages.

3. The seal of claim 1 wherein said rotatable shaft is hollow providing a heat dissipating pathway.

4. The seal of claim 3 wherein said rotatable shaft has a heat dissipating inner shaft.

5. The seal of claim 4 wherein said heat dissipating inner shaft has a plurality of heat dissipating fins.

6. The seal of claim 4 wherein said rotatable shaft and said heat dissipating inner shaft have one or more vent openings.

7. The seal of claim 3 wherein said rotatable shaft has a plurality of heat dissipating fins.

8. The seal of claim 3 wherein said rotatable shaft has one or more vent openings.

9. A self-cooling ferrofluid seal comprising:
    a stationary shaft;
    a housing having a housing case and an external pole piece integrally connected to said housing case wherein said housing case has a plurality of heat dissipating surfaces and one or more vent openings;
    a magnetic circuit within said housing formed in conjunction with said external pole piece wherein said housing and said magnetic circuit are rotatably about said stationary shaft;
    one or more fan blades on an inside surface of said housing, said magnetic circuit, or both; and
    a quantity of magnetic fluid between said stationary shaft and said external pole piece forming a ferrofluid seal.

10. The seal of claim 9 wherein said housing case has a plurality of heat dissipating fins.

11. The seal of claim 9 wherein said magnetic circuit has a plurality of air passages.

12. The seal of claim 9 wherein said stationary shaft is hollow providing a heat dissipating pathway.

13. The seal of claim 12 wherein said stationary shaft has a heat dissipating inner shaft.

14. The seal of claim 13 wherein said heat dissipating inner shaft has a plurality of heat dissipating fins.

15. The seal of claim 13 wherein said stationary shaft and said heat dissipating inner shaft have one or more vent openings.

16. The seal of claim 12 wherein said stationary shaft has a plurality of heat dissipating fins.

17. The seal of claim 12 wherein said stationary shaft has one or more vent openings.

* * * * *